United States Patent
Jung et al.

(10) Patent No.: US 10,866,005 B2
(45) Date of Patent: Dec. 15, 2020

(54) AIR-CONDITIONER SYSTEM AND CONTROL METHOD, WITH FIRST AND SECOND ABNORMALITY DIAGNOSIS

(71) Applicant: LG ELECTRONICS INC., Seoul (KR)

(72) Inventors: Seunghwan Jung, Seoul (KR); Juntae Kim, Seoul (KR); Myungkyoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 15/888,453

(22) Filed: Feb. 5, 2018

(65) Prior Publication Data

US 2018/0224148 A1 Aug. 9, 2018

(30) Foreign Application Priority Data

Feb. 3, 2017 (KR) .................. 10-2017-0015569

(51) Int. Cl.
*F24F 11/38* (2018.01)
*F24F 11/64* (2018.01)
(Continued)

(52) U.S. Cl.
CPC .............. *F24F 11/38* (2018.01); *F24F 11/30* (2018.01); *F24F 11/52* (2018.01); *F24F 11/56* (2018.01);
(Continued)

(58) Field of Classification Search
CPC .. F24F 11/30; F24F 11/38; F24F 11/52; F24F 11/56; F24F 11/61; F24F 11/62;
(Continued)

(56) References Cited

U.S. PATENT DOCUMENTS 4,827,730 A * 5/1989 Doi .................... B60H 1/00978
165/11.1
6,421,632 B1 * 7/2002 LeCorney ............. G06F 11/008
702/185
(Continued)

FOREIGN PATENT DOCUMENTS

EP 1 956 311 8/2008
EP 2056031 A1 * 5/2009 .............. F24F 11/30
(Continued)

OTHER PUBLICATIONS

Machine translation of KR 10-1259803 (Year: 2013).*
(Continued)

*Primary Examiner* — M. N. Von Buhr
(74) *Attorney, Agent, or Firm* — KED & Associates LLP

(57) ABSTRACT

The present disclosure provides an air conditioner system that includes a plurality of air-conditioners, and a management server configured to receive air-conditioner data from the plurality of air-conditioners, and to analyze the received air-conditioner data to diagnose a state of the air-conditioners. The management server is configured to perform a first or short term diagnosis of the state of the air-conditioners. The management server to perform a second or long term diagnosis of the state of the air conditioners during a certain period, based on a result of the first diagnosis.

14 Claims, 6 Drawing Sheets

(51) Int. Cl.
*F24F 11/56* (2018.01)
*F24F 11/52* (2018.01)
*G05B 19/042* (2006.01)
*F24F 11/62* (2018.01)
*F24F 11/61* (2018.01)
*F24F 11/30* (2018.01)

(52) U.S. Cl.
CPC .............. *F24F 11/61* (2018.01); *F24F 11/62* (2018.01); *F24F 11/64* (2018.01); *G05B 19/042* (2013.01); *G05B 2219/2614* (2013.01)

(58) Field of Classification Search
CPC . F24F 11/64; G05B 19/04; G05B 2219/2614; G05B 19/042
See application file for complete search history.

(56) References Cited

U.S. PATENT DOCUMENTS

| | | | | |
|---|---|---|---|---|
| 9,444,392 | B2* | 9/2016 | Goto | H02P 29/0241 |
| 9,450,532 | B2* | 9/2016 | Tanabe | H02P 29/0241 |
| 2005/0222822 | A1* | 10/2005 | Muramatsu | F01D 17/02 |
| | | | | 702/193 |
| 2007/0156373 | A1* | 7/2007 | Yamashita | F25B 49/005 |
| | | | | 702/182 |
| 2008/0186160 | A1* | 8/2008 | Kim | F24F 11/30 |
| | | | | 340/501 |
| 2009/0249876 | A1* | 10/2009 | Uemura | G01C 19/56 |
| | | | | 73/504.12 |
| 2010/0076728 | A1* | 3/2010 | Yanao | G05B 23/0237 |
| | | | | 702/183 |
| 2011/0218682 | A1* | 9/2011 | Cha | H04L 12/2818 |
| | | | | 700/276 |
| 2012/0185728 | A1* | 7/2012 | Guo | G06K 9/6256 |
| | | | | 714/26 |
| 2015/0184880 | A1 | 7/2015 | Kawamura | |
| 2015/0295803 | A1 | 10/2015 | Jung | |
| 2015/0330646 | A1* | 11/2015 | Matsumoto | F24F 11/30 |
| | | | | 700/276 |
| 2016/0283443 | A1* | 9/2016 | Michalscheck | G07C 9/00309 |
| 2017/0363313 | A1* | 12/2017 | Watanabe | G01J 5/0025 |
| 2018/0052207 | A1* | 2/2018 | Kanai | G01R 31/388 |
| 2018/0202681 | A1* | 7/2018 | Kim | F24F 11/30 |
| 2018/0283722 | A1* | 10/2018 | Jung | F24F 11/38 |
| 2019/0265088 | A1* | 8/2019 | Natsumeda | G01D 18/00 |
| 2020/0041988 | A1* | 2/2020 | Natsumeda | G05B 23/024 |

FOREIGN PATENT DOCUMENTS

| | | |
|---|---|---|
| EP | 2 365 664 | 9/2011 |
| JP | 3025819 | 3/2000 |
| KR | 10-1259803 | 4/2013 |
| KR | 10-1450540 | 10/2014 |
| KR | 10-2015-0084551 | 7/2015 |
| KR | 2015-0118277 | 10/2015 |
| KR | 10-1658091 | 9/2016 |

OTHER PUBLICATIONS

Machine translation of KR 10-1450540 (Year: 2014).*
International Search Report dated Jun. 8, 2018 issued in Application No. PCT/KR2018/001420.
European Search Report dated Jun. 14, 2018 issued in Application No. 18154939.5.

* cited by examiner

AIR-CONDITIONER SYSTEM AND CONTROL METHOD, WITH FIRST AND SECOND ABNORMALITY DIAGNOSIS

CROSS-REFERENCE TO RELATED APPLICATION

This application claims priority benefit of Korean Patent Application No. 10-2017-0015569, filed Feb. 3, 2017 in the Korean Intellectual Property Office, the subject matter of which is incorporated herein by reference.

BACKGROUND

1. Field

The present disclosure relates to an air-conditioner system and a control method thereof. More specifically, the present disclosure relates to an air-conditioner system for diagnosing (or determining) an air-conditioner by analyzing data of the air-conditioner and a control method thereof.

2. Background

An air conditioner may provide a comfortable indoor environment to humans by discharging cold air to a room to adjust an indoor temperature and purify air of the room to create a pleasant indoor environment. The air conditioner may include an indoor unit including a heat exchanger and may be installed in a room. The air conditioner may also include an outdoor unit including a compressor, a heat exchanger, and the like, and the outdoor unit may supply a refrigerant to the indoor unit.

The air conditioner, in which the indoor unit including the heat exchanger and the outdoor unit including the compressor, the heat exchanger, and the like, are separately controlled, may be operated by controlling power supplied to the compressor or the heat exchanger. The outdoor unit and the indoor unit may be connected by a refrigerant pipe. Compressed refrigerant from the compressor of the outdoor unit may be supplied to the heat exchanger of the indoor unit through the refrigerant pipe. Heat-exchanged refrigerant in the indoor unit's heat exchanger may flow back into the outdoor unit's compressor through the refrigerant pipe. As a result, the indoor unit may discharge the cold or hot air into the room via the heat exchange using the refrigerant.

Air-conditioners may be interconnected between buildings or interconnected in small groups. An air-conditioner system may transmit and receive the data, determine a condition of the corresponding air conditioner, and diagnose the failure thereof.

Korean Patent Application No. 2014-0043800 discloses that a remote management server may determine an abnormal condition of the air conditioner and transmit information of the abnormal condition to the service center.

However, in the above-mentioned patent document, an AS receipt and repair are proceeded with respect to faults that have already occurred. Rather, in the above-mentioned patent document, there has been a limit to constructing data regarding an abnormality or failure of the air conditioner.

Statistical data for the air conditioners may be obtained by collecting and analyzing data for a plurality of air conditioners dispersed in a plurality of regions. Then, based on the statistical data, the operator may diagnose the air conditioners.

However, a large amount of data may be generated from a single air conditioner, and thus there may be a limit to processing data generated from a plurality of air conditioners, particularly air conditioners distributed in a plurality of regions, in real time.

Additionally, the air conditioner data may be analyzed only when the air conditioner is already in a failure state at time of diagnosis. Thus, there is a problem that it is impossible to predict a failure due to a change in state of the corresponding air conditioner.

BRIEF DESCRIPTION OF THE DRAWINGS

Arrangements and embodiments may be described in detail with reference to the following drawings in which like reference numerals refer to like elements and wherein.

DETAILED DESCRIPTION

For simplicity and clarity of illustration, elements in figures are not necessarily drawn to scale. The same reference numbers in different figures denote same or similar elements, and as such perform similar functionality. Additionally, descriptions and details of well-known steps and elements are omitted for simplicity of the description. Furthermore, in the following detailed description, numerous specific details are set forth in order to provide a thorough understanding of the present disclosure. However, it may be understood that the present disclosure may be practiced without these specific details. In other instances, well-known methods, procedures, components, and circuits may not be described in detail so as not to unnecessarily obscure aspects of the present disclosure. Examples of various embodiments are illustrated and described further below. It may be understood that the description herein is not intended to limit claims to the specific embodiments described. On the contrary, it is intended to cover alternatives, modifications, and equivalents as may be included within the spirit and scope of the present disclosure as defined by the appended claims.

In the following description, usage of suffixes such as 'module', 'part' or 'unit' used for referring to elements may be given merely to facilitate explanation of the present disclosure, without having any significant meaning by itself. Therefore, 'module', 'part', and 'unit' may be mixedly used. Further, a control unit and other units included in the air-conditioner according to the present disclosure may be implemented by one or more processors and implemented by a hardware device.

Figure 1:
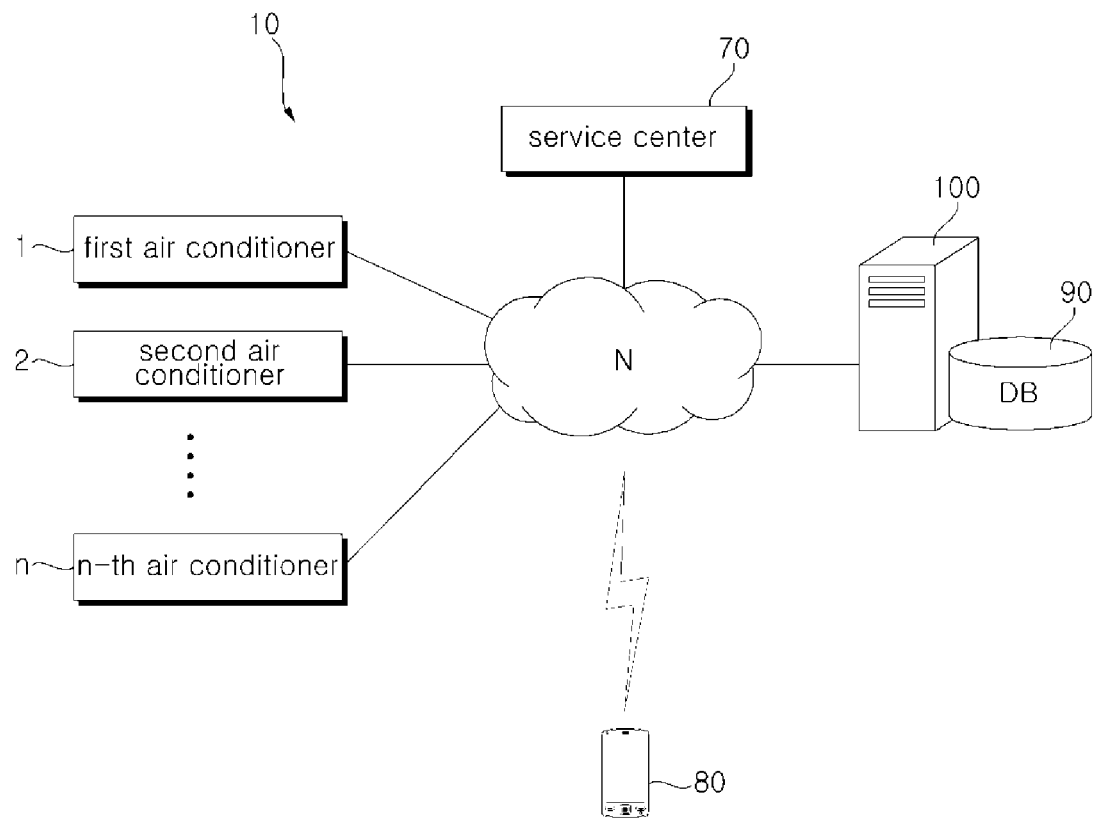
FIG. 1 is a diagram showing an air-conditioner system according to an embodiment of the present disclosure.

FIG. 1 is a diagram showing an air-conditioner system according to an embodiment of the present disclosure. Other embodiments and configurations may also be provided.

As shown in FIG. 1, the air-conditioner system may include a plurality of air-conditioners 1 to n, a service center 70, a management server 100, a database 90, and a terminal device 80 (or terminal).

A plurality of air-conditioners 1 to n, which are installed at a plurality of locations, are connected to the management server 100 over a network N.

The service center 70 may perform customer support, repair and inspection services for the air-conditioner. The service center 70 may receive the user's complaints via the Internet or telephone network, remotely conduct the consultation, and dispatch the service engineer to the place where the air-conditioner is installed in response to the request for repair of the air-conditioner.

The service center 70 may be connected to the management server 100. Accordingly, when it is determined that the air conditioner is malfunctioning, the service center 70 may set a repair reservation (for the air conditioner) to the management server 100 and dispatch a service engineer accordingly.

The terminal device 80 is connected to the air-conditioner via the network N to monitor condition of the air-conditioner and to control the operation thereof. The terminal device 80 may access the service center 70 through the network N to request a service. The terminal device 80 has a communication module (or communication device) mounted therein and performs network connection. The terminal device 80 may be implemented as a device equipped with an air-conditioner control application therein. For example, such a device may include a computer, a laptop, a smart phone, a PDA, a tablet PC, and the like.

Figure 5:
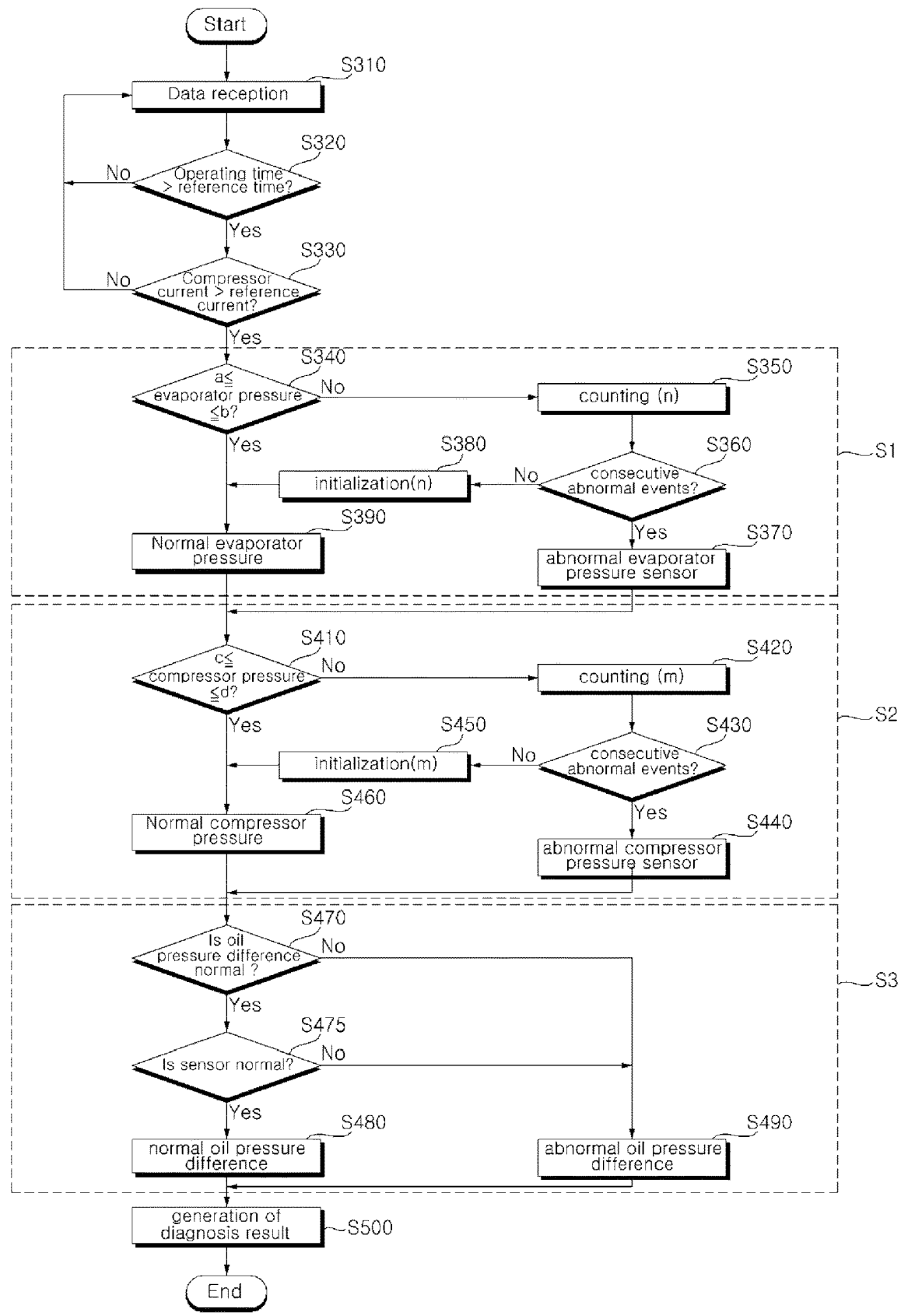
FIG. 5 is a flowchart showing a control method of an air-conditioner system for diagnosis thereof according to an embodiment of the present disclosure.

The management server 100 analyzes the data received from the plurality of air-conditioners 1 to n 10 to determine a state of the air-conditioner and diagnoses the failure thereof. The management server 100 may store the data of the plurality of air-conditioners in the database 90 and manage the stored data. The management server 100 may be constructed as a single server. Alternatively, as shown in FIG. 5, a plurality of servers may be interconnected to process the data in a distributed manner.

The management server 100 may be configured on a region basis or on a country basis to manage air-conditioner data and analyze air-conditioner operation.

The management server 100 may analyze and process the data of a plurality of air-conditioners to obtain statistical information including history of failure of the air-conditioner and power usage based on environment or facility, and to analyze use pattern of the air-conditioner.

Figure 2:
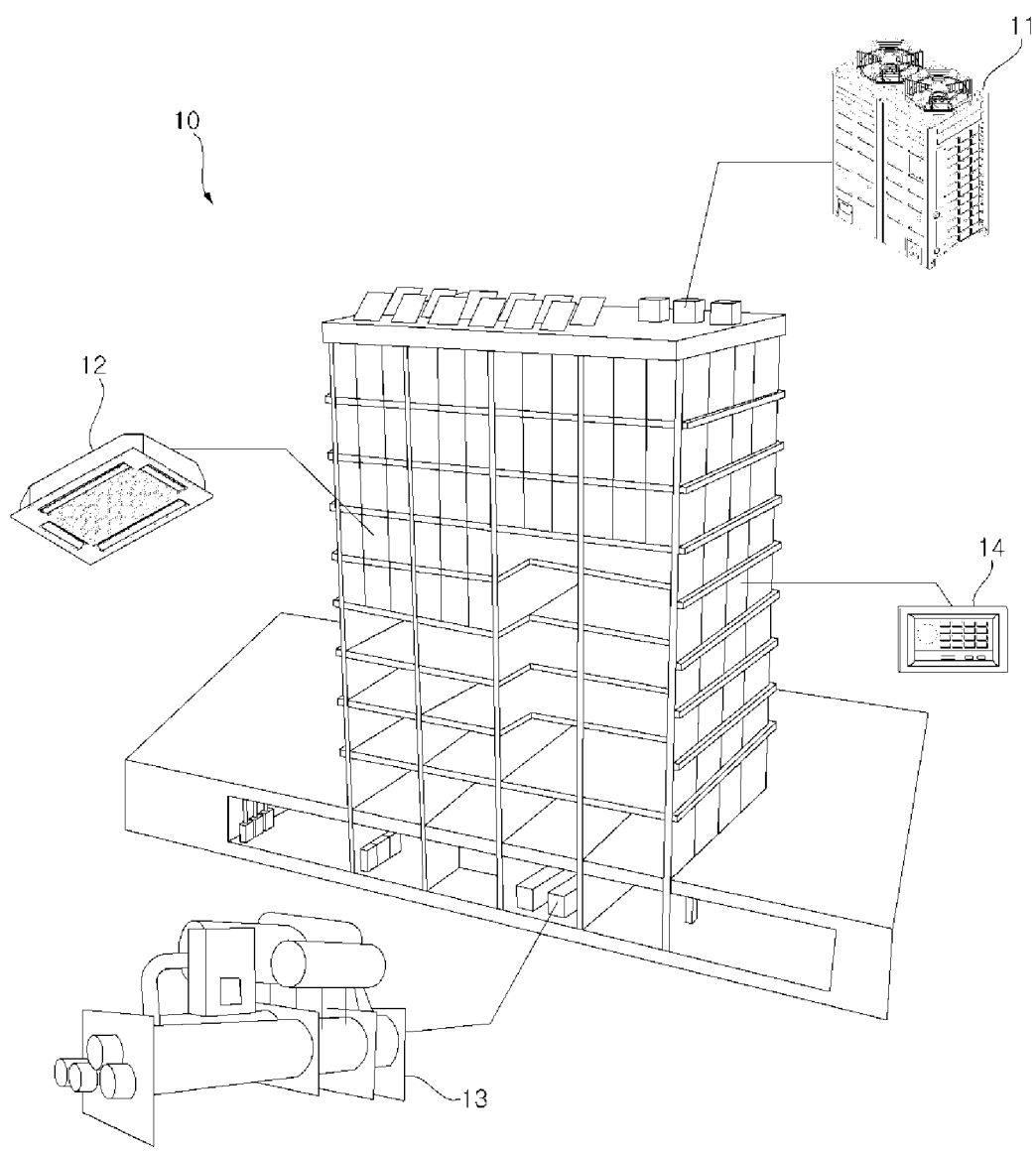
FIG. 2 is a diagram showing an air-conditioner according to an embodiment of the present disclosure.

FIG. 2 shows the air-conditioner according to the embodiment of the present disclosure. Other embodiments and configurations may also be provided.

Referring to FIG. 2, the air-conditioner 10 includes an outdoor unit 11, an indoor unit 12, and a controller 14.

The air-conditioner 10 may include a chiller 13, an air conditioning unit (not shown), a ventilation unit (or ventilator), and the like, and may further include at least one of an air cleaning unit, a humidification unit (or humidifier), and a heater. In the air-conditioner, the units may be interconnected to operate in conjunction with operation of the indoor unit and the outdoor unit. Further, the air-conditioner 10 may operate in connection with a mobile device, a security device, and an alarm device, etc. in a building.

The controller 14 may control operation of the indoor unit 12 and the outdoor unit 11 in response to an input user command (or user input). The controller 14 may periodically receive and store data on the operation states of the indoor unit and the outdoor unit corresponding to the control thereof, and output the operation states on the monitoring screen. The controller 14 may be connected to the indoor unit 12 to perform operation setting, lock setting, schedule control, group control, peak control for power use, and demand control for the indoor unit.

The outdoor unit 11 may be connected to the indoor unit 12 via the refrigerant pipe, and supply refrigerant to the indoor unit. Further, the outdoor unit 11 may periodically communicate with a plurality of indoor units to transmit and receive data therebetween, and to change the operation according to the operation setting changed from the indoor unit.

The indoor unit 12 may include an electronic expansion valve for expanding refrigerant supplied from the outdoor unit 11, an indoor heat exchanger for heat-exchanging refrigerant, an indoor unit fan for allowing indoor air to flow into the indoor heat exchanger and for allowing the heat-exchanged air to be exposed to the indoor, a plurality of sensors, and control means for controlling the operation of the indoor unit. As one example, the control means may be hardware such as a controller or processor.

The indoor unit 12 may include a discharge port for discharging the heat-exchanged air. The discharge port is provided with a wind direction adjusting means for closing the discharge port and controlling the direction of the discharged air. The indoor unit 12 may control the rotating speed of the indoor unit fan, thereby controlling the intake air and the air to be discharged and controlling the air flow rate. The indoor unit 12 may further include an output unit (such as a display) for displaying the operation status and setting information of the indoor unit and an input unit for inputting the setting data. In this regard, the indoor unit 12 may transmit setting information for the air-conditioner operation to a remote controller connected thereto, output the information via the remote controller, and receive data.

The outdoor unit 11 may operate in the cooling mode or the heating mode in response to the data or controller control command received from the indoor unit 12 connected thereto, and supply refrigerant to the indoor unit connected thereto.

In the presence of a plurality of outdoor units, each outdoor unit may be connected to a plurality of indoor units, and the refrigerant may be supplied to a plurality of indoor units via a distributor.

The outdoor unit 11 may include at least one compressor for compressing the refrigerant and discharging the pressurized gas refrigerant, an accumulator that separates the gas refrigerant and the liquid refrigerant from the refrigerant to prevent the non-vaporized liquid refrigerant from entering the compressor, an oil collection unit for collecting oil from the refrigerant discharged from the compressor, an outdoor heat exchanger for condensing or evaporating the refrigerant via heat exchange with the outside air, an outdoor unit fan for introducing air into the outdoor heat exchanger in order to facilitate the heat exchange of the outdoor heat exchanger, and for discharging the heat-exchanged air to the outside, a four-way valve that changes the refrigerant flow path according to operation mode of the outdoor unit, at least one pressure sensor for measuring pressure, at least one temperature sensor for measuring temperature, and a control unit for controlling operation of the outdoor unit and performing communication with other units. The outdoor unit 11 may further include a plurality of sensors, valves, super-coolers, etc., but a description thereof may be omitted below.

Figure 3:
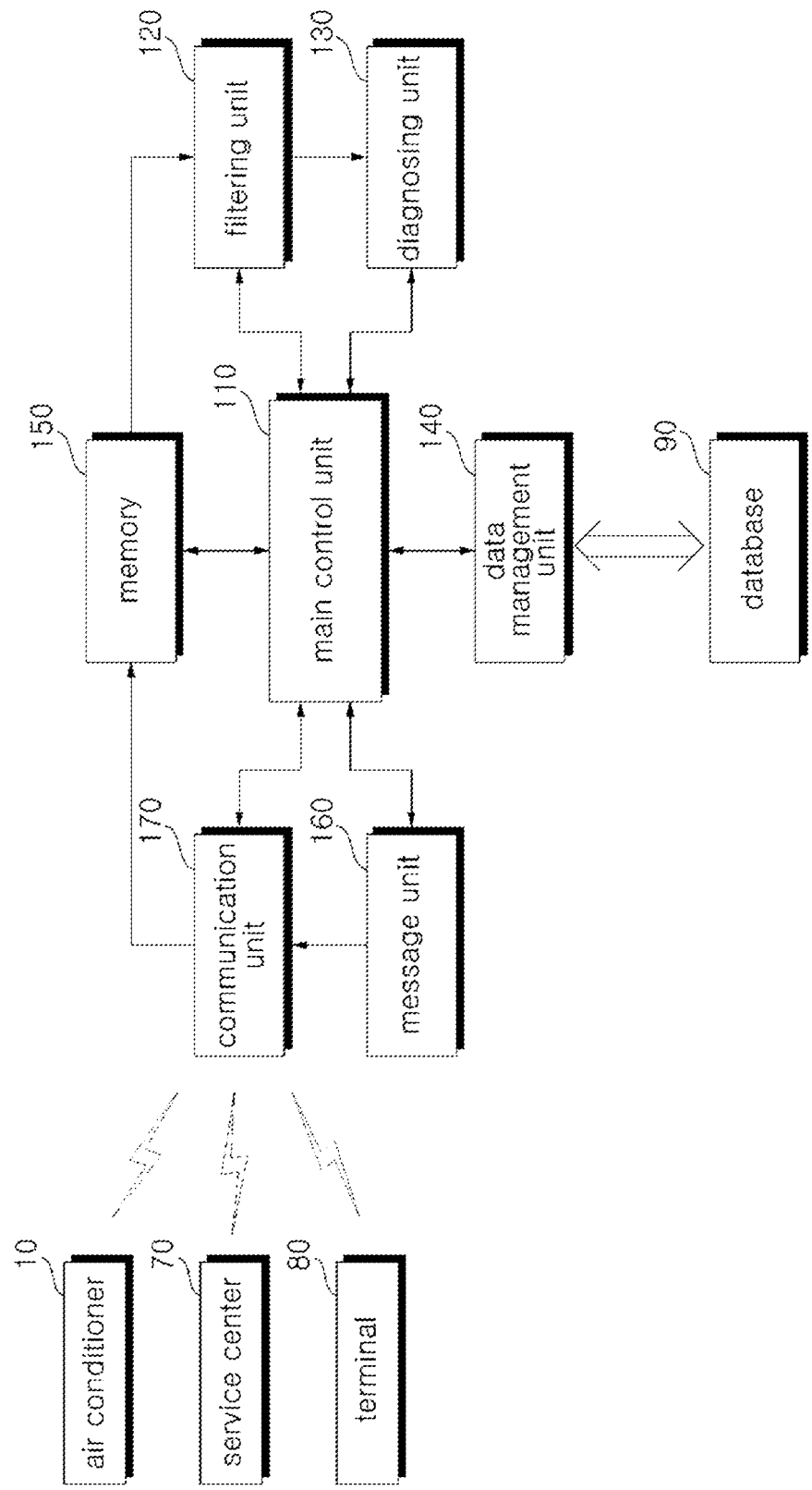
FIG. 3 is a block diagram schematically showing a control configuration of a management server of an air-conditioner system according to an embodiment of the present disclosure.

FIG. 3 is a block diagram schematically showing a control configuration of a management server of an air-conditioner system according to an embodiment of the present disclosure. Other embodiments and configurations may also be provided.

Referring to FIG. 3, the management server 100 may include a communication unit 170, a memory 150, a filtering unit 120, a diagnosing unit 130, a message unit 160, a data management unit 140, and a main control unit 110 (or main controller) for controlling overall operations.

The memory 150 may be a storage device inside the management server, and the memory may store the data of the management server. The memory 150 may store control data for operation and data processing of the management server, data for troubleshooting, and data to be transmitted and received. The memory 150 may be implemented in a hardware manner, as a variety of storage devices such as ROM, RAM, EPROM, flash drive, hard drive, and the like.

The memory 150 may store the air-conditioner data received from the communication unit 170 (or communication device), store the diagnosis result from the diagnosing unit 130, and store the message generated by the message unit 160.

The memory 150 may temporarily store the air-conditioner data. The memory temporarily stores the air-conditioner data for data analysis before the air-conditioner data is stored in the database. Some of the air conditioning data stored in the memory may be discarded by the filtering unit and the diagnosis may be performed with only first remaining data. In response to the diagnostic result of the diagnosing unit, only some data among the first remaining data may be stored in the database 90 and second remaining data among the first remaining data may be discarded.

The communication unit 170 may receive air-conditioner data from the air-conditioner 10 via the network N. When the communication unit 170 receives data from a plurality of air-conditioners 1 to n, the communication unit 170 may store the data in the memory 150. In this connection, the communication unit 170 receives air-conditioner data by communicating with the stopped air-conditioner. That is, when the air-conditioner stops operation for a predetermined time, or when the operation thereof stops after reaching the target temperature, or when the operation thereof stops after the operation is carried out according to the designated schedule, the communication unit 170 transmits (or provides) data of the air conditioner generated or sensed during the operation. When the air-conditioner is in operation, its data change is significant. Thus, when the air-conditioner is shut down, the air conditioner sends air-conditioner data to the server.

The communication unit 170 may be connected to the service center 70 and the terminal device 80 through the network N to transmit and receive data. The communication unit 170 transmits a diagnosis result of the diagnosing unit 130 or a message generated from the message unit 160 to at least one of the service center 70, the terminal device 80 and the air-conditioner 10 in a response to a control command of the main control unit.

The filtering unit 120 (or filter) may filter the air-conditioner data stored in the memory 150. The filtering unit 120 may determine whether the air-conditioner data stored in the memory is machine readable data. The filtering unit 120 may discard the machine unreadable data or otherwise requests that the data corresponding to the unreadable data be retransmitted.

The diagnosing unit 130 may analyze the air-conditioner data and perform parts diagnosis, operation status diagnosis and performance diagnosis on the air-conditioner.

The diagnosing unit 130 may analyze the air-conditioner data to determine whether the air-conditioner is in a normal state or in an abnormal state. The diagnosing unit 130 does not derive a diagnostic result for data indicating a normal state if the air-conditioner is in a normal state.

The diagnosing unit 130 may analyze the air-conditioner data indicating an abnormal condition, and generate a diagnosis result including a solution to the abnormality, cause of the abnormality, and the abnormality state. Further, the diagnosing unit 130 may analyze air-conditioner data to distinguish between normal and malfunctioning conditions. In the event of malfunctioning conditions, the diagnosing unit 130 may generate a diagnostic result that includes the cause of the failure and a solution for resolving the failure.

The diagnosing unit 130 may compare the information included in the air-conditioner data with a reference value (or reference values) to determine whether or not the abnormality is present. The diagnosing unit 130 may analyze the air-conditioner data in consideration of the comparison among the air-conditioners of the same type, examination of the factors according to the external environment, and installation environments of the air-conditioner, and diagnose the failure thereof accordingly.

The diagnosing unit 130 may determine the abnormality of the air conditioner by analyzing the data of the air conditioner based on terms. The diagnosing unit 130 may diagnose failure and abnormality of the air conditioner based on short term data and long term data while diagnosing the air conditioner in real time.

The diagnosing unit 130 may diagnose received data in real time and perform a first diagnosis during a short term. The diagnosing unit 130 may then perform a second diagnosis based on a long term during a first period of abnormality that lasts for a predetermined period of time.

When the abnormality of the air conditioner is determined in real time by the diagnosing unit 130, the diagnosing unit 130 may count number of occurrences of the abnormality. The diagnosing unit 130 may determine abnormality or failure based on the accumulated counts. In this connection, the term 'abnormality' may not refer to a failure, but may refer to a state deviating from a normal state.

When the diagnosing unit 130 performs the real-time diagnosis, the count for determining the continuity of the short term diagnosis data is defined as the first abnormality-event count, while the count of the second diagnosis, which is the long term diagnosis, may be defined as the second abnormality-event count.

The diagnosing unit 130 may determine that there is an abnormality in the part or function of the air conditioner if a series of abnormality occurs during the short term. That is, the diagnosing unit 130 may determine that a single occurrence of abnormality is a temporary phenomenon, and does not diagnose this situation as abnormality of the air conditioner. However, if successive occurrences of the same abnormality continue, the diagnosing unit 130 may determine this situation as abnormality or failure of the air conditioner.

The diagnosing unit 130 may diagnose abnormality or failure based on the second abnormality-event count, which is an accumulation value of the abnormality occurrence counts during the long term.

That is, if abnormality does not occur consecutively for a predetermined period of time, for example, one month, the diagnosing unit 130 may determine such a situation as a normal state. However, if the total occurrence count of the abnormalities is greater than a predetermined count, then the diagnosing unit 130 may determine this situation as abnormality or failure of the air conditioner.

Although the air conditioner is in a normal state during the short term, the air conditioner data may change during the long term, and thus the diagnosing unit 130 may predict the follow-up change of the data. When the follow-up change indicates failure, the diagnosing unit 130 may diagnose this follow-up situation as an abnormality.

In this connection, the abnormal state may include an example when there is a problem with the air-conditioner but the air-conditioner is operational, or an example when performance or efficiency of the air-conditioner is degraded, or an example when the air-conditioner is currently operating but is likely to fail within a certain amount of time. On the other hand, the fault state is a state in which a fault of the air conditioner has already occurred and thus the air conditioner may not be operated.

The diagnosing unit 130 may diagnose sensor and component abnormalities, and predict efficiency and performance of the equipment based on the air-conditioner data. Accordingly, the diagnosing unit 130 may determine whether the corresponding air-conditioner is in a normal state, an abnormal state, and/or a failure state, thereby generating a diagnosis result.

In the example where the air-conditioner is currently in normal operation (i.e., even if the data value is included in the normal range), the performance thereof may be degraded in response to change over a certain period of time. In this example, the management server 100 may determine that the air conditioner is in an abnormal state. The management server 100 may compare not only the current data but also data already stored in the database or data of other air-conditioners of the same model, or data of other air-conditioners having similar performance, to determine whether there is an abnormality for the corresponding air conditioner.

For example, the management server 100 may compare data of air-conditioners based on model year, installation location, model, structure, capacity, and historical data of the air-conditioners, and temperature, humidity, and season information, thereby diagnosing the air-conditioners.

The management server 100 may compare and analyze the values indicated by the cycle information between the air-conditioners from the air-conditioner data to derive the on-site average sensor value, the abnormal value, and the air-conditioner usage pattern. The management server 100 may analyze the sensor value fluctuation based on the external environments by correlating weather information such as the external temperature, humidity, etc. from the air-conditioner data with the sensor values indicated from the cycle information. The management server 100 may diagnose the air-conditioner by comparing the cycle information with the actual installation environment and derive the cycle operation trend according to the installation environment.

In this connection, the air-conditioner 10 may send the air-conditioner data containing the following information to the management server 100: the plurality of information generated or measured during operation thereof, for example, measurements from the temperature sensors such as room temperature, outdoor temperature, refrigerant temperature, compressor pressure, piping pressure, etc., the operating voltage of the valve, the consumed voltage or current value of the valve, the abnormality of the valve, compressor fault, fan motor fault, heat exchanger pollution, lack of refrigerant quantity, information on communication status, efficiency and performance, etc.

When the diagnosis unit 130 determines that the air conditioner is in an abnormal state, the diagnosis unit 130 may check the air conditioner before a failure occurs, and generate a diagnosis result to eliminate the abnormality.

The message unit 160 may generate a message corresponding to the diagnosis result and transmit the generated message to the air-conditioner 10 or the terminal device 80. In this connection, messages are generated in a form readable by the air-conditioner or terminal device. When the message is transmitted to the terminal device, the message may be composed of a short message, a multimedia message, as well as a mobile web page.

When the diagnosis unit 130 determines that the air conditioner is in an abnormal or failed state, the message unit 160 may transmit the diagnosis result for the air-conditioner to the air-conditioner or the terminal device, and transmit the diagnosis result and the failure history to the service center. The message unit 160 may generate messages for an error or failure and transmit them as described above. The message unit 160 may generate or transmit text based error notifications. Alternatively, the message unit 160 may generate and transmit a GUI-based diagnosis result as a report so that the user may confirm the diagnosis result.

The main control unit 110 (or main controller) may control the communication unit to transmit/receive data, and control data input/output into/from the memory.

The main control unit 110 may receive the air-conditioner data from the globally installed plurality of air-conditioners via the network N, temporarily store the data in the memory (not the database), and analyze the data. After diagnosing the failure of the air-conditioner, the main control unit 110 may cause the air-conditioner data to be stored in the database 90.

The main control unit 110 may cause the air-conditioner data for the air-conditioner having the abnormal state to be stored in the database 90 together with the diagnosis result, according to the diagnosis result of the diagnosing unit. The main control unit 110 may delete, from the memory, the air-conditioner data for the air-conditioner determined to be normal by the diagnosing unit and discard the data. The main control unit 110 may store corresponding data in the database if the corresponding data is not data for diagnosing the air conditioner (i.e., cycle data).

The main control unit 110 may cause the diagnosed air-conditioner data to be discarded or stored in the database as described above. Thus, the main control unit 110 may delete the data from the memory so that the new data is stored in the memory.

The data management unit 140 may manage data stored in the database 90 according to a control command of the main control unit. The data management unit 140 may store data in the database, call the stored data, and apply the called data to the main control unit. The data management unit 140 may be connected to the database via a communication unit for transferring data in the database based on a connection state between the management server and the database.

The data management unit may allow data relating to counts (first abnormality-event count, second abnormality-event count) to be stored separately. In this regard, the data management unit may store a count (first abnormality-event count) based on a short term and a count (second abnormality-event count) based on a long term in a distinguishable manner.

In the example where the diagnosis unit 130 indicates an abnormal state or a failure state, the main control unit 110 may allow a diagnosis result to be sent to the service center via the communication unit 170 to perform the service reservation when dispatch of a service technician is required.

The main control unit 110 may cause the message generated by the message unit 160 to be transmitted via the communication unit 170.

The management server may be configured in a single manner. Alternatively, the management server may be configured so that a plurality of servers may process data in a distributed manner. The management server 100 may include a diagnosis server, a data server, a main server, and a distribution management server. Each server may be a single server. Alternatively, each server may be configured such that a plurality of sub-servers may be configured to be interconnected. In the latter example, data may be processed in a distributed manner.

The diagnosis server may analyze the air-conditioner data of the memory, filter the air-conditioner data, analyze the air-conditioner data, diagnose an abnormality or failure, and derive a solution therefrom. The diagnosis server may compare the air-conditioner data of the same type. The diagnosis server may compare the previous and current data of the corresponding air-conditioner to diagnose an abnormality or failure thereof. The diagnosis server may diagnose the air-conditioner based on the data of the external environment or the installation environment to diagnose an abnormality or failure. The data server may store data in the database 90 connected thereto, and retrieve and transmit specific data according to a request. The data server may cause the air-conditioner data to be stored in the database based on the diagnosis result according to the failure diagnosis. The main server may control data transmission/reception of the management server and data input/output into/from the management server. When the management server includes a plurality of servers, the distribution management server allocates data to each server to distribute the flow of each data to each sever such that the servers process the air-conditioner data in a distributed manner. Further, when the diagnosis server is composed of a plurality of sub-servers, the distribution management server assigns air-conditioner data to each diagnosis sub-server.

Figure 4:
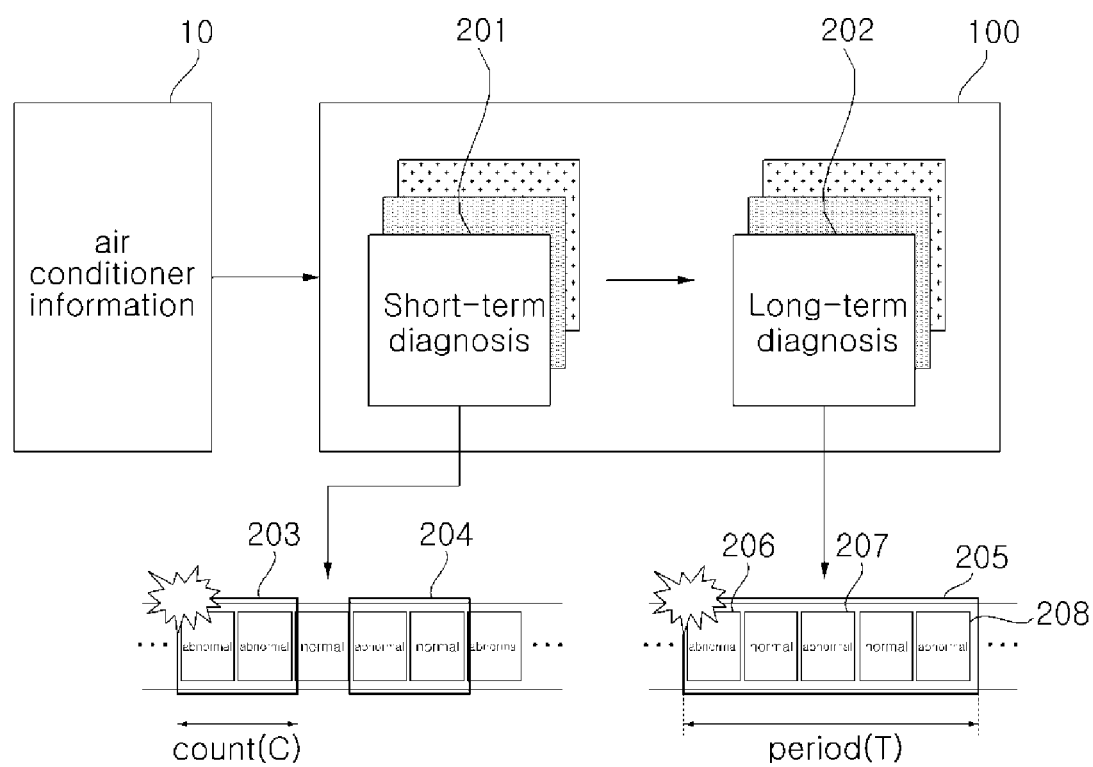
FIG. 4 is a diagram illustrating an air conditioner diagnosis based on terms by the management server of FIG. 3.

FIG. 4 is a diagram illustrating an air conditioner diagnosis based on terms by the management server of FIG. 3. Other embodiments and configurations may also be provided.

As shown in FIG. 4, the management server 100 may receive data about the air conditioner 10, store the data in a memory, and perform a short term diagnosis 201 and a long term diagnosis 202.

The main control unit 110 may store the received data in the memory 150. In this regard, the air conditioner data may be filtered by the filtering unit 120. The diagnosing unit 130 may diagnose abnormality or failure of the air conditioner in real time by analyzing the filtered data.

In this connection, if the abnormality of the air conditioner is determined based on the data diagnosed in real time in the process of the short term diagnosis 201, the diagnosing unit 130 may diagnose this situation as an abnormality state, and separately count the number of abnormality, and store the count data.

At the time of the short term diagnosis 201, the diagnosing unit 130 may count the count C in order to determine whether abnormality occurs continuously. The diagnosing unit 130 may store the first abnormality-event count data C. At the long term diagnosis 202, the diagnosing unit 130 may separately execute a second abnormality-event count as an abnormality count during a first period T, which is a predetermined period. The diagnosing unit 130 may store the second abnormality-event count data.

The diagnosing unit 130 may first diagnose the condition of the air conditioner via a short term diagnosis 201 in real time. The diagnosing unit 130 may accumulate the abnormality counts and store an accumulated count of abnormality. The diagnosing unit 130 may count and accumulate abnormality counts during the first period. The state of the air conditioner may be determined based on the accumulated second abnormality-event count. The first period for the long term diagnosis may be set differently depending on the types of data.

The diagnosing unit 130 may determine that abnormality occurs twice in succession in the short term diagnosis 201 (203). The diagnosing unit 130 may diagnose a corresponding situation as an abnormality condition when the abnormality occurs consecutively twice.

Otherwise, if abnormality occurs but not consecutively, the diagnosing unit 130 may determine that the situation is a temporary abnormal phenomenon and determine this situation as a normal state. Further, the diagnosing unit 130 may count the abnormality occurrence count for the long term diagnosis 202.

The diagnosing unit 130 may count an abnormality count for a particular part and a particular symptom.

The diagnosing unit 130 may perform a long term diagnosis 202 based on the counts accumulated in the short term diagnosis 201.

The diagnosing unit 130 accumulates abnormality occurrence counts based on the 205 during the first period T (as preset). When the accumulated abnormality occurrence count reaches the set count, the diagnosing unit 130 determines that the component or function of the air conditioner is in an abnormality state even when the abnormality does not occur consecutively. For example, if abnormality 206 occurs once and then a normal condition occurs, the diagnosing unit 130 defines such event as a normal condition by the short term diagnosis. Alternatively, if an abnormality occurs once, and then abnormalities 207 and 208 occur, and thus the cumulative abnormality count reaches a predetermined count value, for example, 3, during the first period T, then the diagnosing unit determines that the air conditioner is in an abnormality state.

The diagnosing unit may determine the abnormality of the air conditioner by calculating the predicted change value during the next period based on the change of the data during the current set period. That is, when the value of certain data continuously increases or decreases for a set period such that the value deviates from a predetermined range, the diagnosing unit diagnoses that the air conditioner is in an abnormality state.

The diagnosing unit may diagnose that the air conditioner is in an abnormality state when counts accumulated based on each period increase.

The data management unit 140 may store the data of the air conditioner in the database 90 according to the control command of the main control unit. The data management unit 140 may separately store and manage the count data counted by the diagnosing unit.

The message unit 160 may generate a report on the failure diagnosis result and transmit the generated report to the air conditioner 10 or the control terminal 80 connected thereto. Optionally, the message unit may send the report to the service center 70.

FIG. 5 is a flowchart showing a control method of an air-conditioner system for diagnosis thereof according to an embodiment of the present disclosure. FIG. 5 illustrates a control method for diagnosing air conditioner abnormality by the management server by illustrating a process of diagnosing normal or abnormal pressure difference of oil. Other embodiments and configurations may also be provided.

Referring to FIG. 5, the management server 100 may receive air conditioner data from a plurality of air conditioners 10 (S310). The main control unit 110 may store data in the memory, and the filtering unit may filter the data into data to be used for diagnosis and data not to be used for diagnosis. The diagnosing unit 130 may determine whether the air conditioner has been operated in an abnormality state for a predetermined time period (S320). If an affirmative determination is made, the diagnosing unit 130 may compare the compressor current and the reference current (at S330).

When the air conditioner has been operated for a larger period than a predetermined time period and when the compressor current is above the reference current, the diagnosing unit 130 may diagnose the condition of the air conditioner based on the air conditioner data. When the air conditioner has been operated for a smaller time than the predetermined time period, this may indicate the initial operation of the air conditioner, and thus the data has not been stabilized, and thus it may not be determined whether abnormality occurs. If the compressor current is below the reference current, the compressor may not be considered to be operating normally. Thus, only when the air conditioner has been operated for a larger period than the predetermined time period and the compressor current is above the reference current, then the diagnosing unit 130 may diagnose the condition of the air conditioner based on the air conditioner data.

When the air conditioner has been operating for a smaller period than the predetermined time period and the compressor current is below the reference current, then the diagnosing unit 130 may skip a current data and may diagnose the condition of the air conditioner based on next air conditioner data.

Only when the air conditioner has operated for a larger period than the predetermined time period and the compressor current is above the reference current, the diagnosing unit 130 may diagnose the condition of the air conditioner based on current air conditioner data. For example, to determine the abnormality of the oil pressure difference, the diagnosing unit may first determine the abnormality of the pressure sensor.

The diagnosing unit may perform diagnosis S1 for the evaporator pressure sensor and diagnosis S2 for the compressor pressure sensor, respectively. The diagnosing unit may diagnose abnormality of the oil pressure difference based on the diagnosis results S3. The order between the diagnosis for the evaporator pressure sensor and the diagnosis for the compressor pressure sensor may change.

The diagnosing unit 130 may compare the evaporator pressure with the first reference value a and the second reference value b for the diagnosis S1 for the evaporator pressure sensor (S340).

If the evaporator pressure is greater than the first reference value a and less than the second reference value b, the diagnosing unit 130 may determine that the evaporator pressure is normal (S390).

On the other hand, if the evaporator pressure is less than the first reference value a or exceed the second reference value b, the diagnosing unit 130 primarily determines that the evaporator pressure has abnormality. The diagnosing unit 130 increments the count n by 1 according to the evaporator pressure abnormality. The diagnostic unit 130 determines whether abnormality of the evaporator pressure has occurred continuously (S360).

The diagnosing unit 130 may determine the evaporator pressure to have abnormality when the abnormality of the evaporator pressure occurs continuously. For example, the diagnosing unit 130 may determine that the pressure value measurement is not normally performed because abnormality of the evaporator pressure sensor occurs.

On the other hand, if the diagnosing unit 130 determines that the evaporator pressure is in a normal state, the diagnosing unit 130 initializes the count n (S380) since the abnormality state has not occurred continuously. Further, the diagnosing unit 130 diagnoses that the abnormality state is a transient phenomenon and that the evaporator pressure sensor is in a normal state.

The initialization of the count may be performed only when the continuity is determined. Therefore, if it is determined that the evaporator pressure is in the normal state, then the count may be initialized. At the time when the evaporator pressure is determined to have abnormality, the count may be kept uninitialized. Next, whether or not the count is initialized may be determined at the next determination time.

For example, the data may be determined to have abnormality two consecutive times, whereby the air conditioner is diagnosed as having an abnormality state. In this connection, when the diagnosing unit diagnoses the first evaporator pressure, and it is determined that the pressure has an abnormality, the corresponding count may be left uninitialized since there is no previous data to the first evaporator pressure data. When the second evaporator pressure is judged to have an abnormality and thus it is judged that the abnormality occurs twice in succession, then this event is considered to not be a transient phenomenon, and thus the condition of the air conditioner is diagnosed as abnormality.

On the other hand, when the second evaporator pressure is judged as being in the normal state, the diagnosing unit initializes the count because there is no consecutive occurrence of abnormality. After the diagnosing unit initializing the count, the diagnosing unit maintains the count at a first time, and from the next time it may initialize the corresponding count according to the corresponding determination result.

In the example where the number of determination criteria for occurrence of continuous abnormality is three consecutive occurrences, the initialization time may be changed to a third time as described above.

The diagnosing unit may compare the compressor pressure to a third reference value c and a fourth reference value d for a diagnosis S2 for the compressor pressure sensor. Based on the comparison result, the diagnosing unit may determine whether the compressor pressure sensor has abnormality (S410).

The diagnosing unit 130 may determine that the compressor pressure sensor is in a normal state when the compressor pressure is equal to or greater than the third reference value c and less than the fourth reference value d.

On the other hand, the diagnosing unit 130 may primarily determine that the compressor pressure has abnormality when the compressor pressure is less than the third reference value c or exceeds the fourth reference value d. The diagnosing unit 130 may increment the corresponding count m by one according to the compressor pressure abnormality (S420). The diagnosing unit 130 may determine whether or not the abnormality of the compressor pressure occurs continuously (S430).

When the diagnosing unit 130 determines that the compressor pressure abnormality occurs continuously, the diagnosing unit 130 may diagnose that the compressor pressure sensor has abnormality (S440). Alternatively, if the compressor pressure abnormality does not occur continuously (i.e., at the next time), the pressure is determined to be in a normal state, the diagnosing unit 130 initializes the corresponding count m and determines the previous abnormality state as a temporary or transient phenomenon. Accordingly, the diagnosing unit 130 may determine that the compressor pressure is in the normal state (S460).

After, in this manner, the diagnosis S1 for the evaporator pressure sensor and the diagnosis S2 for the compressor pressure sensor are performed, the diagnostic unit may perform diagnosis S3 for the oil pressure difference.

The diagnosing unit 130 may compare the oil pressure difference with a reference value to determine whether the oil pressure difference is normal or not (S470).

The diagnosing unit 130 may determine that the oil pressure difference has abnormality when the oil pressure difference is out of the reference value (S490). Otherwise, if the oil pressure difference is normal, then the diagnosing unit 130 may determine whether the sensor is in a normal state (S475).

In the example where any one of the diagnosis result S1 for the evaporator pressure sensor and the result of the diagnosis S2 for the compressor pressure sensor as described above indicates an abnormality, the diagnosing unit 130 may determine that the oil pressure difference has abnormality since the oil pressure difference is not normally measured (S490).

If the oil pressure difference is normal and the sensor has a normal state, then the diagnosing unit 130 may finally determine that the oil pressure difference is normal (S480).

The diagnosing unit 130 may generate a diagnosis result including the determination result of the pressure sensor with respect to the oil pressure difference and the determination result of the oil pressure difference (S550).

The diagnosing unit 130 thus diagnoses the abnormality of the oil pressure difference based on the short term.

Figure 6:
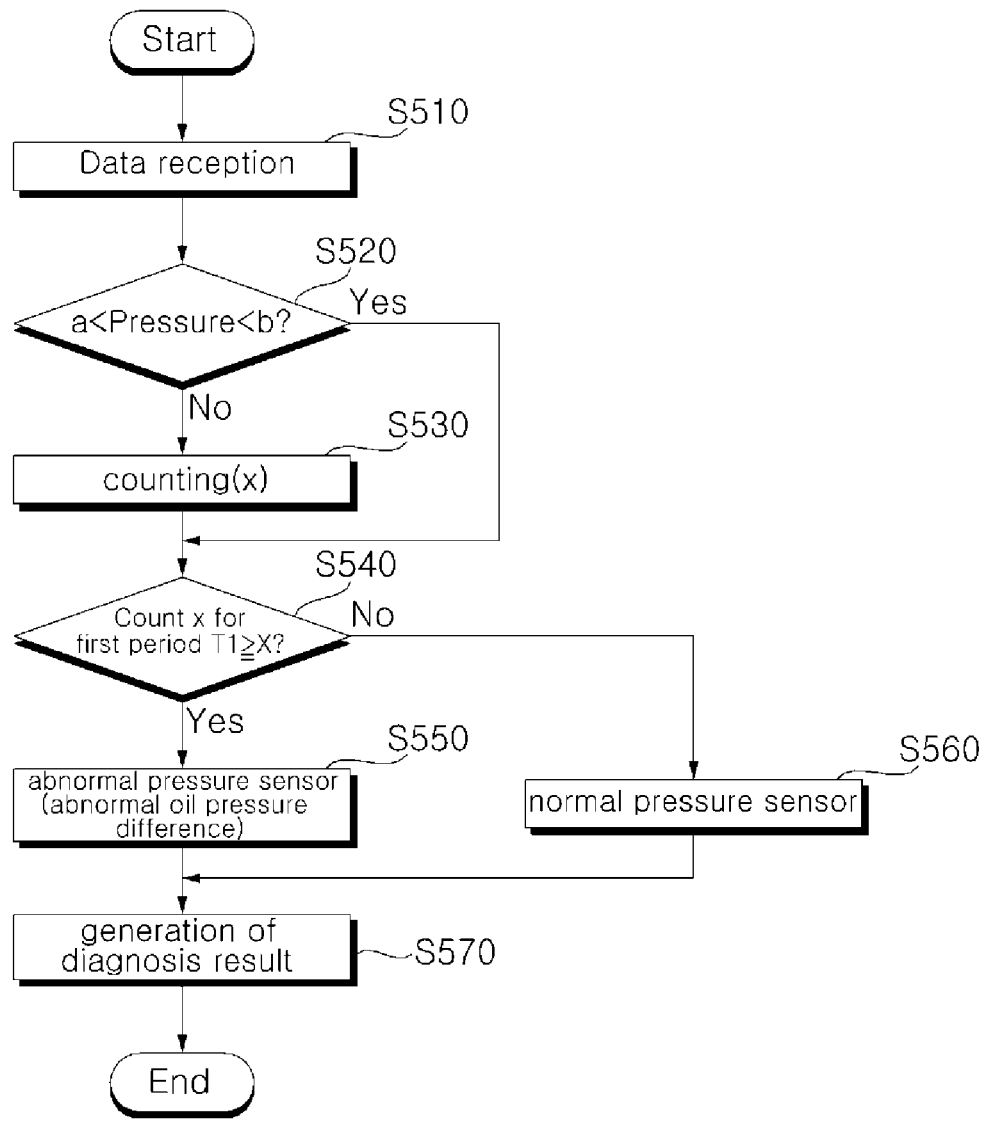
FIG. 6 is a flowchart illustrating a method for diagnosing a failure of an air conditioner system based on long term data according to an embodiment of the present disclosure.

FIG. 6 is a flowchart illustrating a method for diagnosing a failure of an air conditioner system based on long term data according to an embodiment of the present disclosure. Other embodiments and configurations may also be provided.

As described above, the diagnosing unit performs the diagnosis based on the short term for the oil pressure difference and the pressure sensor. When the short-term diagnosis result indicates abnormality, the diagnosing unit separately accumulates corresponding abnormality counts. Then, based on the long term, the oil pressure difference and abnormality of the pressure sensor may be diagnosed.

As shown in FIG. 6, when data is received via the communication unit, the main control unit stores data in a memory, and the filtering unit may perform filtering on the data. The filtering unit may apply the filtered data to the diagnosing unit, whereby the diagnostic unit may perform a diagnosis of the condition of the air conditioner.

The main control unit may call the count-related data generated from the process of diagnosing the condition of the air conditioner based on the short term. Then, the diagnosing unit 130 may diagnose abnormality or failure based on the accumulated count data.

In this connection, the main control unit may discard data indicating the normal state from the diagnostic data, and store data indicating abnormality or failure from the diagnostic data into the database.

The diagnosing unit 130 may compare the pressure value (e.g., evaporator pressure or compressor pressure) with a respective reference value. If the evaporator pressure or compressor pressure is within the reference value range, the diagnosing unit 130 may determine that the pressure value is normal. Alternatively, if the evaporator pressure or compressor pressure is not within the reference value range, then the diagnosing unit 130 determines the pressure value to have abnormality.

As described above, when the evaporator pressure is equal to or greater than the first reference value a and less than the second reference value b, then the diagnosing unit 130 determines that the evaporator pressure is normal. Further, when the compressor pressure is equal to or greater than the third reference value c and less than the fourth reference value d, the diagnosing unit may determine that the compressor pressure sensor is in a normal state.

If the pressure value deviates from the reference value range and is determined to have abnormality, then the diagnosing unit 130 counts the count x. The diagnosing unit may count the counts separately for the evaporator pressure and the compressor pressure (S530).

The diagnosing unit counts the count separately from the count for determining the continuity of the abnormality occurrence in the short term diagnosis process. The diagnosing unit accumulates the counts during a predetermined period as the first period T regardless of whether the abnormality occurs consecutively.

The diagnosing unit 130 compares the count x accumulated during the first period T with the reference count X (S540).

If the count of the events determined as having abnormality during the first period T is less than the reference count, the diagnosing unit 130 determines that the pressure sensor is normal (S560). If the oil pressure difference is included in the reference value range, it is determined that the pressure difference is in a normal state.

To the contrary, if the count of the events determined as having abnormality during the first period T is larger than or equal to the reference count, the diagnosing unit 130 determines that the pressure sensor is abnormal (S550). In this regard, if the pressure sensor is determined to have an abnormality, the diagnosing unit diagnoses that the oil pressure difference is also in an abnormality state.

The diagnosing unit may determine the abnormality of the air conditioner using the count of abnormality events occurring during the long term. That is, the diagnostic unit determines, based on the count, whether the abnormality of the pressure sensor or the oil pressure difference has repeatedly occurred, and diagnoses whether the air conditioner is in an abnormality state.

The diagnosing unit may compare counts of abnormality events that occur based on periods respectively. If the count of abnormality events increases, then the diagnostic unit may diagnose that the air conditioner has an abnormality state. The diagnosing unit may diagnose the abnormality state by comparing diagnostic data generated based on the periods on the first period basis.

The diagnosing unit 130 may generate a diagnosis result based on the accumulated count data during a predetermined period (S570).

The main control unit may store the diagnosis result generated by the diagnosing unit. The message unit may generate a message including the diagnosis result to be transmitted to a terminal, a service center, and an air conditioner.

If the main control unit determines that the repair of the air conditioner is necessary based on the diagnosis result, the main control unit may transmit the diagnosis result to a service center or an air conditioner, and a corresponding message may be transmitted to the terminal.

One purpose of the present disclosure is to provide an air-conditioner system and a control method thereof. In particular, an object of the present disclosure to provide an air-conditioner system for diagnosing an air-conditioner by analyzing air-conditioner data based on time periods and a control method thereof.

In one aspect, there is provided an air conditioner system comprising: a plurality of air-conditioners; a management server configured to receive air-conditioner data from the plurality of air-conditioners at a predetermined time interval and to analyze the received air-conditioner data to diagnose a state of the air-conditioners, wherein the management server has a memory; and a database configured to store the air-conditioner data therein, wherein the management server is configured to receive the air-conditioner data from the air-conditioners, to store the received air-conditioner data in the memory, and, thereafter, to analyze the air-conditioner data to perform a first diagnosis of the state of the air-conditioners, wherein the management server is configured to perform a second diagnosis of the state of the air conditioners during a first period, based on a result of the first diagnosis.

In one embodiment of the system, the management server includes: a communication unit for receiving the air-conditioner data; a main control unit for storing the air-conditioner data in the memory; and a diagnosing unit for analyzing the air-conditioner data to determine whether the air-conditioner data corresponds to a normal, abnormal, or failure state.

In one embodiment of the system, when it is determined based on the air conditioner data that a corresponding air conditioner is in an abnormality state in the first diagnosis, the diagnosing unit counts a first abnormality-event count and determines based on the first abnormality-event count whether abnormality events occur consecutively, wherein when it is determined that the abnormality events occur consecutively in the first diagnosis, the diagnosing unit is configured to diagnose that the corresponding air conditioner is in a failure state.

In one embodiment of the system, when it is determined based on the air conditioner data that a corresponding air conditioner is in an normality state in the first diagnosis, the diagnosing unit is configured to initialize the first abnormality-event count.

In one embodiment of the system, when it is determined that the abnormality events does not occur consecutively in the first diagnosis, the diagnosing unit is configured to determine that the abnormality event is a transient event and to diagnose that the corresponding air conditioner is in a normal state.

In one embodiment of the system, when it is determined based on the air conditioner data that a corresponding air conditioner is in an abnormality state in the first diagnosis, the diagnosing unit is configured to count a second abnormality event count for the second diagnosis.

In one embodiment of the system, when the second abnormality-event count reaches a reference count during the first period, the diagnosing unit diagnoses that the corresponding air conditioner is in an abnormality state.

In one embodiment of the system, when the second abnormality-event count increases over periods on the first period basis, the diagnosing unit diagnoses that the corresponding air conditioner is in an abnormality state. In one embodiment of the system, the diagnosing unit is configured to perform the second diagnosis as change of a corresponding air conditioner data during the first period occurs, wherein when performance degradation of the corresponding air conditioner is predicted based on the second diagnosis, the diagnosing unit diagnoses that the corresponding air conditioner is in an abnormality state.

In another aspect, there is provided an air conditioner system characterized in that the system comprises: a plurality of air-conditioners; a management server configured to receive air-conditioner data from the plurality of air-conditioners at a predetermined time interval and to analyze the received air-conditioner data to diagnose a state of the air-conditioners, wherein the management server has a memory; and a database configured to store the air-conditioner data therein, wherein the management server is configured to receive the air-conditioner data from the air-conditioners, to store the received air-conditioner data in the memory, and, thereafter, to analyze the air-conditioner data to perform a first diagnosis of the state of the air-conditioners, wherein the management server is configured to perform a second diagnosis of the state of the air conditioners during a first period, based on a result of the first diagnosis, wherein the management server includes a diagnosing unit for analyzing the air-conditioner data to determine whether the air-conditioner data corresponds to a normal, abnormal, or failure state.

In still another aspect, there is provided an air conditioner system characterized in that the system comprises: a plurality of air-conditioners; and a management server configured to receive air-conditioner data from the plurality of air-conditioners at a predetermined time interval and to analyze the received air-conditioner data to diagnose a state of the air-conditioners, wherein the management server has a memory; wherein the management server is configured to receive the air-conditioner data from the air-conditioners, to store the received air-conditioner data in the memory, and, thereafter, to analyze the air-conditioner data to perform a short term diagnosis of the state of the air-conditioners, wherein the management server is configured to accumulate the short term diagnosis results and to perform a long term diagnosis of the state of the air conditioners.

In still another aspect, there is provided a method for controlling an air-conditioner system, the method comprising: receiving air-conditioner data from a plurality of air-conditioners; storing the received air-conditioner data in a memory; preforming a first diagnosis of states of the air-conditioners by analyzing the air-conditioner data; generating a diagnosis result of the first diagnosis; preforming a second diagnosis of states of the air-conditioners by accumulating data for a first period based on the first diagnosis result; and generating a diagnosis result of the second diagnosis.

In the air conditioner system and its control method according to the present disclosure, configured as described above, the multiple air conditioner data are stored in the memory and the condition of the air conditioner is diagnosed based on the selected data, failure of the air conditioner may be handled in real time, the abnormality of the air conditioner may be diagnosed based on the short term.

Further, the present disclosure may be configured such that in diagnosing the condition of the air conditioner by analyzing the data of the air conditioner, the temporary abnormality event is excluded and the failure or abnormality condition is diagnosed for the consecutive abnormality events; further, for abnormality events that occur repeatedly based on a long term for a predetermined period of time, the condition of the air conditioner is diagnosed, thereby improving the diagnostic accuracy of abnormality or failure thereof.

According to the present disclosure, by analyzing and diagnosing a plurality of air conditioner data based on periods, the system may immediately respond to the failure that occurred. By diagnosing abnormality of sensors and parts in air conditioner and predicting failure thereof, the system may prevent damage to the air conditioner. The air conditioner may be checked and repaired to maintain constant performance and, thus, the efficiency of the air conditioner may be improved.

The present disclosure may be configured such that in diagnosing the condition of the air conditioner by analyzing the data of the air conditioner, the temporary abnormality event is excluded and the failure or abnormality condition is diagnosed for the consecutive abnormality events; further, for abnormality events that occur repeatedly based on a long term for a predetermined period of time, the condition of the air conditioner is diagnosed, thereby improving diagnostic accuracy of abnormality or failure thereof.

When all the elements that make up the embodiment of the present disclosure are described as being combined into a single group, the present disclosure is not necessarily limited to this embodiment. Within the scope of the present disclosure, all components may be combined into in multiple groups depending on the embodiment.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner system comprising:
   a plurality of air-conditioners;
   a management server configured to receive air-conditioner data from the plurality of air-conditioners, to store the received air-conditioner data in a memory of the management server, and to analyze at least a portion of the received air-conditioner data to determine a state of one of the air-conditioners; and
   a database configured to store the air-conditioner data,
   wherein the management server is configured to analyze the portion of the air-conditioner data to perform a first diagnosis of the one of the air-conditioners, and the management server is configured to perform a second diagnosis of the one of the air conditioners during a first period, based on a result of the first diagnosis,
   wherein the management server includes:
      a diagnosing unit for analyzing the air-conditioner data to determine whether the portion of the air-conditioner data corresponds to a normal state, an abnormal state, or a failure state, wherein when the corresponding air conditioner is determined to be in the abnormal state based on the first diagnosis, the diagnosing unit is to provide a first abnormality-event count and determine abnormality or failure, based on the first abnormality-event count, whether abnormality events occur consecutively during a short term, in the first diagnosis, wherein when the abnormality events are determined to occur consecutively based on the first diagnosis, the diagnosing unit is configured to determine that the corresponding air conditioner is in the failure state, wherein when a corresponding air conditioner is determined to be in the abnormal state based on the first diagnosis, the diagnosing unit is configured to provide a second abnormality-event count for the second diagnosis and determine abnormality or failure of the air conditioner based on the second abnormality-event count during the first period, in the second diagnosis, wherein when the second abnormality-event count equals a reference count during the first period, the diagnosing unit determines that the corresponding air conditioner is in the abnormal state.

2. The air conditioner system of claim 1, wherein the management server includes:
the memory;
a communication device to receive the air-conditioner data; and
a controller to store the air-conditioner data in the memory.

3. The air conditioner system of claim 1, wherein when a corresponding air conditioner is determined to be in the normal state based on the first diagnosis, the diagnosing unit is configured to initialize the first abnormality-event count.

4. The air conditioner system of claim 1, wherein when the abnormality events are determined to not occur consecutively in the first diagnosis, the diagnosing unit is configured to determine that the abnormality event is a transient event and to determine that the corresponding air conditioner is in the normal state.

5. The air conditioner system of claim 1, wherein when the second abnormality-event count increases over periods of the first period, the diagnosing unit determines that the corresponding air conditioner is in the abnormal state.

6. The air conditioner system of claim 1, wherein the diagnosing unit is configured to perform the second diagnosis based on change of a corresponding air conditioner data when the first period occurs,
wherein when performance degradation of the corresponding air conditioner is determined based on the second diagnosis, the diagnosing unit determines that the corresponding air conditioner is in the abnormal state.

7. The air conditioner system of claim 1, wherein the diagnosing unit is configured to compare air-conditioner data of each air conditioner with previously stored air-conditioner data, data of other air-conditioner, or data of a same part in each air-conditioner, and the diagnosing unit to determine whether the air-conditioner data of each air-conditioner corresponds to the normal state, the abnormal state, or the failure state.

8. The air conditioner system of claim 1, wherein the controller is configured to transmit results for the first diagnosis and the second diagnosis to at least one of a terminal, a service center, and a corresponding air conditioner,
wherein when a portion of the air-conditioner data indicates the abnormal state or the failure state of a corresponding air conditioner, the controller is configured to transmit a repair request of the corresponding air conditioner to the service center via a communication device.

9. The air conditioner system of claim 1, wherein the controller is configured to:
delete, from the memory, air conditioner data indicative of the normal state based on results of the first diagnosis or the second diagnosis; and
store, in the database, air conditioner data indicative of the abnormal state or the failure state based on results of the first diagnosis or the second diagnosis.

10. The air conditioner system of claim 1, wherein the management server includes:
a message unit configured to provide a message based on results of the first diagnosis or the second diagnosis,
wherein the message unit is configured to provide the message in a format corresponding to a destination to receive the message, wherein the format includes one of a diagnostic result report, a web page, a text, a short message, and a multimedia message.

11. A method for controlling an air-conditioner system, the method comprising:
receiving, at a device, air-conditioner data from a plurality of air-conditioners;
storing the received air-conditioner data in a memory;
performing a first diagnosis of one of the air-conditioners based on a portion of the air-conditioner data;
determining whether the portion of the air-conditioner data corresponds to a normal state, an abnormal state, or a failure state, based on the first diagnosis by analyzing the air-conditioner data;
providing a first abnormality-event count and determining, based on the first abnormality-event count, whether abnormality events occur consecutively, when a corresponding air conditioner is determined to be in an abnormal state based on the first diagnosis;
determining that the corresponding air conditioner is in a failure state when the abnormality events are determined to occur consecutively based on the first diagnosis;
providing a second abnormality-event count for a second diagnosis, when a corresponding air conditioner is determined to be in the abnormality state;
providing a diagnosis result of the first diagnosis;
performing the second diagnosis of one of the air-conditioners by accumulating data for a first period based on the result of the first diagnosis;
determining that the corresponding air conditioner is in an abnormal state when the second abnormality-event count equals a reference count during the first period; and
providing a diagnosis result of the second diagnosis.

12. The method of claim 11, wherein performing the first diagnosis includes:
when a corresponding air conditioner is determined to be in a normal state based on the first diagnosis, initializing the first abnormality-event count.

13. The method of claim 11, wherein performing the first diagnosis includes:
when the abnormality event is determined to not occur consecutively in the first diagnosis, determining that the abnormality event is a transient event and determining that the corresponding air conditioner is in a normal state.

14. The method of claim 11, wherein performing the second diagnosis includes:
  when the second abnormality-event count increases over periods of the first period, determining that the corresponding air conditioner is in an abnormal state.

\* \* \* \* \*